Patented Aug. 28, 1951

2,565,921

UNITED STATES PATENT OFFICE 2,565,921

CONDENSATION OF O,O-DIESTERS OF DI-THIOPHOSPHORIC ACID AND ALIPHATIC ALCOHOLS OR MERCAPTANS WITH HIGHER ALIPHATIC ALDEHYDES

Edwin O. Hook, Old Greenwich, Conn., and Philip H. Moss, Austin, Tex., assignors to American Cyanamid Company, New York, N. Y., a corporation of Maine No Drawing. Original application March 26, 1948, Serial No. 17,395. Divided and this application March 7, 1950, Serial No. 148,278

2 Claims. (Cl. 260—461)

This invention relates to the production of triesters of dithiophosphoric acid, and particularly to the production of esters of this class which are soluble in hydrocarbon oils and possess antioxidant and anticorrosion properties therefor. Many of the esters of the invention are also good insecticides.

This is a division of our copending application Serial No. 17,395, filed March 26, 1948, wherein the esters are claimed as new compositions of matter. A novel method for the preparation of these esters is claimed herein, this method consisting essentially in the step of condensing together an O,O-diester of dithiophosphoric acid, an aliphatic monohydric alcohol or mercaptan and a higher aliphatic aldehyde, as will hereinafter be more fully described.

The novel dithiophosphoric acid triesters of the invention are defined by the formula:

(1)
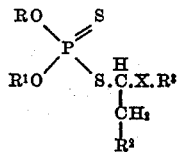

in which X is oxygen or sulfur, each of R and R$^1$ is an ester forming radical, which term includes alkyl, cycloalkyl and arylalkyl radicals as well as substituted aliphatic radicals and aromatic radicals such as a phenyl or substituted phenyl radical, R$^3$ is an aliphatic radical and R$^2$ is hydrogen or an aliphatic radical. It will thus be seen that the compounds are O,O-dialkyl-, diaryl- or mixed alkyl-aryl-S-alkylidene triesters of dithiophosphoric acid.

Most of the novel compounds of the invention are light to dark colored liquids which are soluble in lubricating oil and in benzene, toluene, kerosene, light mineral oils and other non-polar solvents. They are very effective in preventing the oxidation of mineral oils, such as mineral lubricating oils, and in preventing or reducing the corrosion of bearings lubricated by these oils, when used in amounts of 0.1–5% or more in weight, based on the weight of the oil. They also possess the property of improving the corrosion inhibition of other lubricating oil additives such as polyvalent metal salts of diesters of dithiophosphoric acid, notably barium dialkyldithiophosphates in which the alkyl radicals contain from 5–10 or more carbon atoms, calcium petroleum sulfonate and other organic oil-soluble sulfonates, alkyl phenol sulfides and their metal salts such as barium 2,4-dialkyl phenol monosulfide and the like. Many of these esters also possess insecticidal properties and may be used as pest controls in the form of solutions in kerosene or other mineral hydrocarbon solvents, or as aqueous emulsions or as mists or vapors.

We have discovered that compounds of the type defined by the above formula in which X is either oxygen or sulfur can be prepared by condensing an aliphatic monohydric alcohol or an aliphatic monomercaptan with an O,O-diester of dithiophosphoric acid and with an alkanal such as acetaldehyde, propionaldehyde, butyraldehyde or other higher aliphatic aldehyde. This condensation takes place when the reagents are mixed together at ordinary room temperature or at elevated temperatures up to 100° C. or higher; however, the condensation reaction is exothermic and positive cooling of the reaction mixture is frequently advisable. The reaction is illustrated by the following equation:

(2)
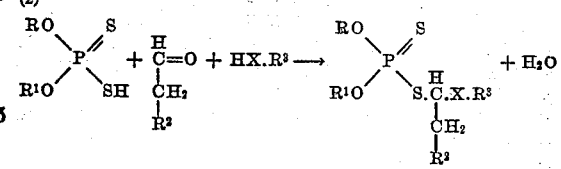

in which X, R, R$^1$, R$^2$ and R$^3$ are as defined above.

Any O,O-dialiphatic dithiophosphoric acid diester including the dicycloalkyl dithiophosphoric acid esters or any O,O-diaryl dithiophosphoric acid ester or any mixed O,O-diester of dithiophosphoric acid may be used in practicing the process of our invention and in producing the novel products thereof. When compounds having a relatively high percentage of combined phosphorus and sulfur are desired, as in the production of lubricating oil antioxidants having a high activity at relatively low temperatures, it is preferable to employ an O,O-dialkyl dithiophosphoric acid in which the alkyl groups are of relatively low molecular weight, such as methyl, ethyl, propyl or butyl radicals. Dialkyl dithiophosphoric acids of higher molecular weight may of course be employed, such as diamyl, di-n-hexyl, dicyclohexyl or dioctyl dithiophosphoric acids, as well as the didecyl, didodecyl, ditetradecyl or dioctadecyl dithiophosphoric acids. The O,O-diaryl dithiophosphoric acids may frequently be used to advantage, as in the production of lubricating oil additives having a high degree of heat stability wherein the O,O-di-phenyl-, O,O-di-alkylphenyl-, and O,O-di-naphthyl dithiophosphoric acids may be employed. Still other diaryl dithiophosphoric acids may be used in the production of compounds for other purposes; thus, for example, in the production of insecticides and fungicides the use of O,O-di-chlorphenyl or di-bromphenyl dithiophosphoric acids in accordance with the process of the invention is frequently advantageous. It will be understood that mixed O,O-dithiophosphoric acid diesters may also be employed, as where a mixed alkyl-phenyl dithiophosphoric acid is used to combine the oil-solubilizing properties of an aliphatic radical with the heat-stabilizing and sludge-inhibiting properties of the phenolic and particularly the alkylphenyl derivatives in a lubricating oil.

Any aliphatic monohydric alcohol or monomercaptan may be used in the condensation of an O,O-diester of dithiophosphoric acid with an alcohol or mercaptan and a higher aliphatic aldehyde. Aliphatic monohydric alcohols which may be used include the saturated alkanols such as ethanol, methanol, etc. up to and including octadecanol, and either the straight-chain or branched-chain normal, secondary or tertiary alcohols may be used. The corresponding mercaptans of 1-18 or more carbon atoms may also be employed, or mixtures of alcohols and mercaptans may be used. Similarly, any higher aliphatic monoaldehyde may be employed, typical examples being acetaldehyde, butyraldehyde, isobutyraldehyde, valeraldehyde, hexaldehyde, octanaldehyde, myristic aldehyde, stearic aldehyde, or in general any aliphatic aldehyde of 2 to 18 carbon atoms inclusive.

As is noted above, the condensation between the O,O-dithiophosphoric acid diesters and the monohydric or polyhydric aliphatic alcohol or mercaptan can be carried out simply by mixing these two reagents with the aldehyde. It is unnecessary to maintain any particular ratio of reacting ingredients, as the three reagents condense in equimolecular ratios; in fact it is frequently convenient to maintain an excess of alcohol or mecaptan present in the reaction to function as a diluent. Other non-reactive diluents such as volatile hydrocarbons of the type of benzene, toluene, solvent naphtha and the like may be used if desired. The condensation product is easily recovered from the reaction mixture in a purified form by washing with water or a dilute aqueous sodium carbonate solution, or both, followed by heating to 90-100° C. at reduced pressure to strip off volatile impurities.

The novel products of the present invention are preferably used in lubricating oils in relatively small quantities which may vary from about 0.1% up to about 4-5% or greater, depending on the particular oil and on the degree of protection desired therein. In automobile engine lubricating oils, quantities on the order of 0.2% to 2-3% are usually incorporated into the oil. Our novel antioxidants are compatible with all of the commonly used detergents, stabilizers, sludge-inhibitors and other ingredients of compounded oils and may be used in conjunction with smaller or larger quantities of aliphatic or aromatic sulfonates such as calcium petronate, alkyl phenol sulfides such as p-p'dibutyl-, diamyl- or dioctyl phenol mono- or polysulfides and their polyvalent metal salts, 2,4-dialkyl phenol mono- or polysulfides and their metal salts and metal salts of oxygen- or sulfur-containing acids of phosphorus such as those described in U. S. Patents Nos. 2,364,284 and 2,228,658 and Reissue 22,829. These and other additives are usually employed in the oils in quantities of about 0.1-5%, most commonly in quantities of about 0.5-2%, in admixture with the anti-oxidants of the present invention.

The invention will be further illustrated in greater detail by the following specific examples. It should be understood, however, that although these examples may describe in detail some of the specific features of the invention, they are given primarily for purposes of illustration and the invention in its broader aspects is not limited thereto.

Example 1

A mixture of 61 grams (0.23 mol) of di-n-propyldithiophosphoric acid and 46 grams (1.0 mol) of ethanol was prepared and 14 grams (0.32 mol) of acetaldehyde was added with agitation and cooling. The mixture was then allowed to stand overnight after which the reaction product was washed well with water and stripped of volatiles by heating under reduced pressure on a steam bath. The product weighed 66 grams and was a thin, nearly colorless liquid which was found by analysis to contain 24.1% sulfur and 13% phosphorus. It was the O,O-di-n-propyl-S-ethoxyethylidenedithiophosphate.

Example 2

Twenty-two grams (0.31 mol) of butyraldehyde was added to a mixture of 61 grams (0.25 mol) of di-n-propyldithiophosphoric acid and 46 grams (1.0 mol) of ethanol and the mixture was agitated for two hours at room temperature and then allowed to stand overnight. The product was washed with water and then with dilute sodium carbonate solution and was heated on a steam bath at reduced pressure. There was obtained 80 grams of a light-colored liquid which was easily soluble in lubricating oil. It was the O,O-di-n-propyl-S-ethoxybutylidenedithiophospate.

Example 3

Following the procedure described in the previous example, 14 grams of acetaldehyde was added to a mixture of 54 grams (0.25 mol) of diethyldithiophosphoric acid and 23 grams (0.25 mol) of tertiary-butylmercaptan. After washing and stripping there was obtained 91 grams of O,O - diethyl - S - tert. butylthioethylidenedithiophosphate, a light-colored liquid which contained 27.5% of sulfur and 9.2% phosphorus.

Example 4

A mixture of 109 grams (0.5 mol) of diethyldithiophosphoric acid and 46 grams (1 mol) of ethanol was prepared and 57 grams (0.5 mol) of heptaldehyde was added with stirring. The mixture was heated on a steam bath for one hour and was then allowed to stand overnight. The product, a turbid oil, was washed with water and dilute sodium carbonate solution and stripped at reduced pressure on a steam bath after which a yield of 150 grams of an oil-soluble liquid was obtained.

What we claim is:

1. A method of producing S-alkylidene alkyl ether and thioether triesters of dithiophosphoric acid of the formula

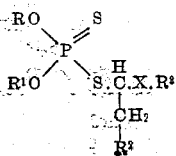

in which X is a member of the group consisting of oxygen and sulfur, each of R and R¹ is a member of the group consisting of alkyl and aromatic radicals, R³ is an alkyl radical and R² is a member of the group consisting of hydrogen and alkyl radicals which comprises condensing together an O,O-diester of dithiophosphoric acid of the formula

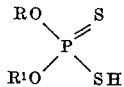

in which R and R¹ are as defined above, an aldehyde of the formula

R².CH₂.CHO in which R² is as defined above, and a member of the group consisting of aliphatic monohydric alcohols and aliphatic monomercaptans.

2. A method of producing S-ethylidene alkyl ether and thio-ether triesters of dithiophosphoric acid of the formula

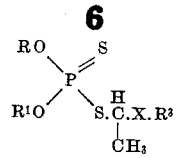

in which X is a member of the group consisting of oxygen and sulfur, each of R and R¹ is a member of the group consisting of alkyl and aromatic radicals and R³ is an alkyl radical which comprises condensing together an O,O-diester of dithiophosphoric acid of the formula

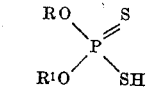

in which R and R¹ are as defined above, a member of the group consisting of aliphatic monohydric alcohols and aliphatic monomercaptans, and acetaldehyde.

EDWIN O. HOOK.
PHILIP H. MOSS.

No references cited.